United States Patent
Setiabudi et al.

[11] Patent Number: 5,143,999
[45] Date of Patent: Sep. 1, 1992

[54] HARDENABLE MIXTURES OF EPOXIDE RESIN MATERIALS CONTAINING POLYOXYALKYLENE-DITHIOLS AND POLYAMINES

[75] Inventors: Frans Setiabudi, Bad Krozingen, Fed. Rep. of Germany; Jean-Pierre Wolf, Marly, Switzerland

[73] Assignee: Ciba-Geigy Corporation, Ardsley, N.Y.

[21] Appl. No.: 441,133

[22] Filed: Nov. 22, 1989

[30] Foreign Application Priority Data

Nov. 23, 1988 [CH] Switzerland .......... 4350/88
Sep. 7, 1989 [CH] Switzerland .......... 3247/89

[51] Int. Cl.⁵ .............................. C08G 59/50
[52] U.S. Cl. .................... 528/109; 528/361; 528/374; 528/103; 525/505; 525/504
[58] Field of Search ............ 528/109, 361, 374; 525/505, 504

[56] References Cited

U.S. PATENT DOCUMENTS

| | | | |
|---|---|---|---|
| 3,090,793 | 5/1963 | Casement | 528/109 |
| 3,352,810 | 11/1967 | Cameron et al. | 528/109 |
| 3,472,913 | 10/1969 | Ephraim | 260/830 |
| 3,914,288 | 10/1975 | Garnish et al. | 260/481 R |
| 4,092,293 | 5/1978 | Harris et al. | 528/109 |
| 4,126,505 | 11/1978 | Garnish et al. | 156/330 |

FOREIGN PATENT DOCUMENTS

256715 5/1988 Fed. Rep. of Germany .
1077997 8/1967 United Kingdom .

OTHER PUBLICATIONS

C.A., 88:106246s (1978).
Lee & Neville, pp. 16–21 to 16–30.
Indust. and Eng. Chem., 48, 98–103 (1956).

Primary Examiner—John C. Bleutge
Assistant Examiner—Frederick Krass
Attorney, Agent, or Firm—JoAnn Villamizar

[57] ABSTRACT

Hardenable mixtures of materials, comprising
(a) an epoxide resin,
(b) a dithiol of the formula I or II

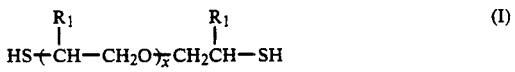

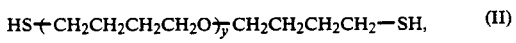

in which the $R_1$s independently of one another are hydrogen or methyl, x is an integer from 2 to 50 and y is an integer from 1 to 30, and
(c) a polyamine having at least two primary amino groups, give, after hardening, flexible and tough-lasting products. They are suitable, if appropriate in combination with further additives, for example for the production of sealing compositions, injection compositions, adhesives, moulding resins, matrix resins, casting resins or coating compositions.

17 Claims, No Drawings

HARDENABLE MIXTURES OF EPOXIDE RESIN MATERIALS CONTAINING POLYOXYALKYLENE-DITHIOLS AND POLYAMINES

The invention relates to hardenable mixtures of materials consisting of epoxide resins, special polyoxyalkylene-dithiols and polyamines having at least two primary amino groups, to the crosslinked products obtainable from them and to the use of the mixtures especially for the production of sealing compositions and injection compositions.

Epoxide resins are distinguished by many good properties. On the other hand, cured products have a flexibility and toughness which is inadequate for certain applications. A large number of additives which have a flexbilizing action has therefore been described in the literature, also including compounds which contain thiol groups (cf., for example, Lee and Neville "Handbook of Epoxy Resins", pages 16-21 to 16-30, McGraw-Hill, New York 1967). Amongst these, the liquid polysulfide polymers of the general formula

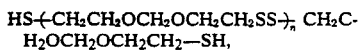

which are known under the trade name Thiokols ® and are in most cases used in combination with amine curing agents, have received most attention. Epoxide resins modified with such polysulfides and the properties thereof are extensively described by K. R. Cranker and A. J. Breslau in Industrial and Engineering Chemistry 48:1, 98-103 (1956).

U.S. Pat. No. 3,090,793 describes polyesters containing mercaptan groups, obtained by reacting mercaptoalcohols, for example 2-mercaptoethanol, with polycarboxylic acids having at least 18 C atoms, especially polymeric fatty acids, and the use of these products together with basic catalysts, preferably with tertiary amines, as hardeners for epoxide resins. The hardened systems show good mechanical and electrical properties and, inter alia, also an increased flexibility.

U.S. Pat. No. 3,352,810 also described epoxide resins of improved flexibility which, in addition to the resin and the conventional hardeners for epoxide resins, contain an ester, having two or more SH groups, of a mercaptocarboxylic acid with a polyol, as a flexibilizer. Preferred mercaptocarboxylic acids are thioglycolic acid or 3-mercaptopropionic acid, and preferred polyols are polyethylene glycols, polypropylene glycols and polypropylene triols. The hardeners used are, inter alia, primary, secondary and tertiary amines.

U.S. Pat. No. 3,472,913 describes polyethers containing both hydroxyl groups and thiol groups and having a molecular weight of at least 1000 and a theoretical thiol groups/hydroxyl groups quantitative ratio greater than one. The number of thiol groups per molecule can here vary as desired. These polymers containing thiol groups can be crosslinked with a large number of reagents, also including epoxide resins. In the case of mixtures with epoxide resins, a basic catalyst is preferably also used, for example an amine. The crosslinked products are distinguished by high toughness and extensibility.

In U.S. Pat. No. 4,126,505, mixtures of materials are described which contain (i) an epoxide resin, (ii) as a hardener for the epoxide resin, an amine having at least three H atoms which are bound directly to an aliphatic or cycloaliphatic amine nitrogen atom, or certain tertiary amines, (iii) a polymercaptan and (iv) a polyene having at least two activated ethylenic double bonds. The mixtures of materials are suitable as adhesives which, by reaction of the polymercaptan with the polyene, rapidly form a rubber-like adhesive bond and then fully crosslink as a result of the hardening of the epoxide resin by the amine. Amongst a large number of polymercaptans, such as mercaptan-containing polyesters, sulfides with mercaptan end groups, polybutadienes or butadiene/acrylonitrile copolymers and poly-(monomercaptancarboxylates) having mercaptan end groups, which polymercaptans can be used as the component (iii), oxyalkylene compounds with mercaptan end groups are also mentioned.

U.S. Pat. No. 3,914,288 describes adducts obtained by reacting an epoxide resin with a polymercaptan having at least two SH groups, which are separated from one another by a chain of at least 6 carbon atoms or carbon atoms and oxygen atoms, and an amine. These adducts are used as hardeners for the production of flexible epoxide resins. Polymercaptans preferred for the preparation of the adducts are esters of mercaptocarboxylic acids and polyols, oligomers and polymers having recurring disulfide units, polymercaptans containing hydroxyl groups, obtained by reacting a chlorohydrin ether of a polyhydric alcohol with a hydrosulfide in an alcoholic medium, as well as polyesters containing thiol groups.

DD 256,715 describes a process for the preparation of high-molecular thermoplastic epoxide/amine/dithiol polyadducts, which are soluble in various solvents and have mean molecular masses $\overline{M}_n > 5000$. Oxyalkylene-dithiols, for example triglycol dithiol, are also used as the dithiol.

In spite of the many solutions suggested in the state of the art, none is able fully to overcome the difficulties in the production of flexible, tough-elastic systems based on epoxide resins.

The present invention relates to hardenable mixtures of materials, comprising
(a) an epoxide resin,
(b) a dithiol of the formula I or II

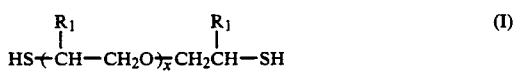

in which the $R_1$s independently of one another are hydrogen or methyl, x is an integer from 2 to 50 and y is an integer from 1 to 30 and,
(c) a polyamine having at least two primary amino groups.

The invention also relates to the crosslinked products obtainable by hardening the mixture of materials. These products are distinguished by increased flexibility and tough-elastic properties, combined with strength and hardness values which are still good.

The epoxide resin (a) used can in principle be any compound conventional in epoxide resin technology.

Examples of epoxide resins are:

I) Polyglycidyl esters and poly-(β-methylglycidyl) esters obtainable by reacting a compound having at least two carboxyl groups in the molecule and epichlorohydrin or β-methyl-epichlorohydrin respectively.

The reaction is appropriately carried out in the presence of bases.

Aliphatic polycarboxylic acids can be used as the compound having at least two carboxyl groups in the molecule. Examples of these polycarboxylic acids are oxalic acid, succinic acid, glutaric acid, adipic acid, pimelic acid, suberic acid, azelaic acid or dimerized or trimerized linoleic acid.

However, cycloaliphatic polycarboxylic acids can also be used, for example tetrahydrophthalic acid, 4-methyltetrahydrophthalic acid, hexahydrophthalic acid or 4-methylhexahydrophthalic acid.

Moreover, aromatic polycarboxylic acids can be used, for example phthalic acid, isophthalic acid or terephthalic acid.

II) Polyglycidyl ethers or poly-($\beta$-methylglycidyl) ethers obtainable by reacting a compound having at least two free alcoholic hydroxyl groups and/or phenolic hydroxyl groups and epichlorohydrin or $\beta$-methylepichlorohydrin under alkaline conditions, or in the presence of an acidic catalyst and subsequent alkali treatment.

Ethers of this type are derived, for example, from acyclic alcohols such as ethylene glycol, diethylene glycol and higher polyoxyethylene glycols, propane-1,2-diol or polyoxypropylene glycols, propane-1,3-diol, butane-1,4-diol, polyoxytetramethylene glycols, pentane-1,5-diol, hexane-1,6-diol, hexane-2,4,6-triol, glycerol, 1,1,1-trimethylolpropane, pentaerythritol, sorbitol and also from polyepichlorohydrins.

They can, however, also be derived, for example, from cycloaliphatic alcohols such as 1,4-cyclohexanedimethanol, bis-(4-hydroxycyclohexyl)-methane or 2,2-bis-(4-hydroxycyclohexyl)-propane, or they have aromatic nuclei, such as N,N-bis-(2-hydroxyethyl)-aniline or p,p'-bis-(2-hydroxyethylamino)-diphenylmethane.

The epoxide compounds can also be derived from mononuclear phenols, for example from resorcinol or hydroquinone; or they are based on polynuclear phenols, for example bis-(4-hydroxyphenyl)-methane, 4,4'-dihydroxybiphenyl, bis-(4-hydroxyphenyl) sulfone, 1,1,2,2-tetrakis-(4-hydroxyphenyl)-ethane, 2,2-bis-(4-hydroxyphenyl)-propane, 2,2-bis-(3,5-dibromo-4-hydroxyphenyl)-propane or on novolaks obtainable by condensation of aldehydes, such as formaldehyde, acetaldehyde, chloral or furfural, with phenols such as phenol or with phenols which are substituted in the nucleus by chlorine atoms or $C_1$-$C_9$alkyl groups, for example 4-chlorophenol, 2-methylphenol or 4-tert-butylphenol, or by condensation with bisphenols in the way described above.

III) Poly-(N-glycidyl) compounds obtainable by dehydrochlorination of the reaction products of epichlorohydrin with amines which contain at least two amine hydrogen atoms. These amines are, for example, aniline, n-butylamine, bis-(4-aminophenyl)-methane, m-xylylenediamine or bis-(4-methylaminophenyl)-methane.

The poly-(N-glycidyl) compounds also include, however, triglycidyl isocyanurate, N,N'-diglycidyl derivatives of cycloalkyleneureas, such as ethyleneurea or 1,3-propyleneurea, and diglycidyl derivatives of hydantoins, such as 5,5-dimethylhydantoin.

IV) Poly-(S-glycidyl) compounds, for example di-S-glycidyl derivatives derived from dithiols, for example ethane-1,2-dithiol or bis-(4-mercaptomethylphenyl) ether.

V) Cycloaliphatic epoxide resins, for example bis-(2,3-epoxycyclopentyl) ether, 2,3-epoxycyclopentyl-glycidyl ether, 1,2-bis-(2,3-epoxycyclopentyloxy)-ethane or 3,4-epoxycyclohexylmethyl 3',4'-epoxycyclohexanecarboxylate.

However, epoxide resins can also be used in which the 1,2-epoxide groups are bound to different heteroatoms or functional groups: these compounds include, for example, the N,N,O-triglycidyl derivative of 4-aminophenol, the glycidyl ether/glycidyl ester of salicylic acid, N-glycidyl-N'-(2-glycidyloxypropyl)-5,5-dimethylhydantoin or 2-glycidyloxy-1,3-bis-(5,5-dimethyl-1-glycidylhydantoin-3-yl)-propane.

Preferably, epoxide resins having an epoxide content of 2 to 10 equivalents/kg are used, which are glycidyl ethers, glycidyl esters, or N-glycidyl derivatives of aromatic, heterocyclic, cycloaliphatic or aliphatic compounds.

Epoxide resins used particularly preferably are polyglycidyl ethers of polyhydric phenols, for example of 2,2-bis-(4-hydroxyphenyl)-propane (bisphenol A) or bis-(4-hydroxyphenyl)-methane (bisphenol F).

The most preferred epoxide resins are the diglycidyl ethers of bisphenol A.

The dithiols used as component (b) of the mixtures of materials according to the invention are derived from polyoxyalkylene glycols. They can be obtained, for example, by reacting the corresponding polyoxyalkylene glycol with thionyl chloride to give the corresponding dichloro derivative, followed by reaction of the dichloro derivative with thiourea and hydrolysis of the product to give the desired dithiol. The reaction scheme can be illustrated as follows

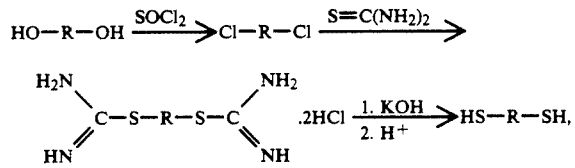

in which R represents the polyoxyalkylene chain. The said reaction of alcohols to give thiols is described, for example, in Organic Synthesis, Collective Volume 3, pages 698–700, and Collective Volume 4, pages 401–403, Wiley, N.Y. 1955 and 1963 respectively.

The starting compounds for the preparation of the diothiols (b) are commercially available in various molecular weight ranges.

The dithiols of the formula I can be polyethylene glycol derivatives, polypropylene glycol derivatives or also copolymers having oxyethylene units and oxypropylene units. The copolymers can be block polymers or random polymers. The corresponding block polymers are sometimes also described as polypropylene glycol ethoxylate or polyethylene glycol propoxylate, depending on whether they have terminal polyethylene glycol blocks or polypropylene glycol blocks. The commerically available polypropylene glycols predominantly have secondary terminal hydroxyl groups, as is shown for the corresponding dithiols of the formula I. It is self-evident that polypropylene-dithiols having primary thiol groups can also be used as component (b) of the mixtures of materials according to the invention. The dithiols of the formula II, which can be used according to the invention, are derived from polytetrahydrofurandiols. Polytetrahydrofuran-diols are known and are also commerically available. Examples of such products are Poly-THF 650®, Poly-THF 1000® or Poly-THF 2000® from BASF, which correspond to compounds of the formula II with y equal to 7-8, 12-13 and 26-27 respectively, after the reaction to give the corresponding dithiols. These compounds are preferred amongst the dithiols of the formula II.

Dithiols of the formula I or II having a molecular weight $\overline{M}_n$ of less than 2000, in particular less than 1000, are preferred in the mixtures of materials according to the invention.

Dithiols of the formula I, in which x is an integer from 2 to 20, especially from 2 to 12, and dithiols of the formula II, in which y is an integer from 1 to 12, especially from 2 to 8, are particularly preferred.

The dithiol of the formula I in which $R^1$ is hydrogen and $x=7-8$ and especially 2, is most preferred. The last-mentioned dithiol is also known as triglycol dimercaptan or 1,2-bis-(2'-mercaptoethoxy)-ethane.

Any desired amine having at least two primary amino groups, i.e. at least 2 $NH_2$ groups, can be used as the polyamine component (c) of the mixtures of materials according to the invention. The amine can have two or even more $NH_2$ groups and can also contain secondary and/or tertiary amine nitrogen atoms in addition.

Examples of polyamines (c) are aliphatic, cycloaliphatic, aromatic and heterocyclic amines, such as bis-(4-aminophenyl)-methane, aniline/formaldehyde resins, bis-(4-aminophenyl) sulfone, propane-1,3-diamine, 2,2-dimethyl-1,3-propanediamine (neopentanediamine), hexamethylenediamine, diethylenetriamine, bis-(3-aminopropyl)-amine, N,N-bis-(3-aminoproyl)-methylamine, triethylenetetramine, pentaethylenehexamine, 2,2,4-trimethylhexane-1,6-diamine, m-xylylenediamine, 1,2- and 1,4-diaminocyclohexane, bis-(4-aminocyclohexyl)-methane, bis-(4-amino-3-methylcyclohexyl)-methane, 2,2-bis-(4-aminocyclohexyl)-propane and 3-aminomethyl-3,5,5-trimethylcyclohexylamine (isophoronediamine), polyaminoimidazolines as well as polyaminoamides, for example those of aliphatic polyamines and dimerized or trimerized fatty acids. Other suitable polyamines (c) are the polyoxyalkyleneamines known as Jeffamines® sold by Texaco, for example Jeffamine® EDR 148, D 230, D 400 or T 403.

When cycloaliphatic or aliphatic polyamines are used, glycidyl esters are preferably not used as the resin component.

Aliphatic or cycloaliphatic polyamines are preferred as the component (c) of the mixtures of materials according to the invention. Amongst the cycloaliphatic and heterocyclic polyamines, 3-aminomethyl-3,5,5-trimethylcyclohexylamine (isophoronediamine), bis-(4-aminocyclohexyl)-methane and polyaminoimidazolines, for example the polyaminoimidazoline sold by Schering AG as Eurodur® 370, are particularly preferred. Amongst the aliphatic polyamines (c), compounds of the formulae IV to IX are preferred.

$$H_2-R^2-NH_2, \quad H_2N\text{+}CH_2CH_2O\text{)}_a CH_2CH_2-NH_2$$
(IV) (V)

-continued

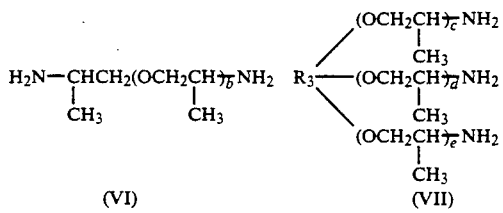

(VI) (VII)

$$H_2N\text{+}CH_2CH_2CH_2NH)_c\text{-}CH_2CH_2CH_2-NH_2$$
(VIII)

$$H_2N\text{+}CH_2CH_2NH)_g CH_2CH_2-NH_2,$$
(IX)

in which $R^2$ is a straight-chain or branched $C_2$-$C_{10}$alkylene radical, a is an integer from 1 to 10, preferably 2, b is an integer from 1 to 10, preferably 2 to 6, c, d and e independently of one another are an integer from 1 to 20, preferably 2 to 5, s is an integer from 1 to 5, preferably 1, and g is an integer from 1 to 10, preferably 1 to 5, and $R^3$ is a trivalent radical of the formulae

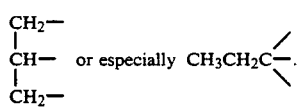

2,2,4-Trimethylhexane-1,6-diamine, Jeffamine® EDR 148 of the formula V with $a=2$, Jeffamine® D 230 or D 400 of the formula VI with $b=2-3$ or $b=5-6$ respectively, Jeffamine® T 403 of the formula VII, bis-(3-aminopropyl)-amine, diethylenetriamine, triethylenetetramine and pentaethylenehexamine are very particularly preferred.

In addition to the polyamines (c) having at least 2 $NH_2$ groups, the mixtures according to the invention can also contain minor quantities, for example less than 50% by weight of the polyamine (c), of other amines. An example of such an amine is 3-(N,N-dimethylaminopropyl)-3'-aminopropylamine.

If desired, the mixtures of materials according to the invention can also contain hardening accelerators, although mixtures without a hardening accelerator are preferred. Examples of hardening accelerators are tertiary amines, salts or quaternary ammonium compounds thereof, such as benzyldimethylamine, 2,4,6-tris-(dimethylaminomethyl)-phenol, 1-methylimidazole, 2-ethyl-4-methylimidazole, 4-aminopyridine, tripentylammonium phenate or tetramethylammonium chloride; or alkali metal alcoholates, such as Na alcoholates of 2,4-dihydroxy-3-hydroxymethylpentane; or substituted ureas, such as N-(4-chlorophenyl)-N',N'-dimethylurea or N-(3-chloro-4-methylphenyl)-N',N'-dimethylurea (chlorotolurone).

In addition to the dithiols (b) of the formula I or II, the mixtures of materials according to the invention can also contain minor quantities, for example less than 50% by weight of the dithiol (b), of other dithiols or polythiols. However, mixtures which contain only the compounds of the formula I or II as the thiol component are preferred.

The hardening of the mixtures of materials according to the invention in general takes place even at low temperatures from about 0° C. to room temperature. If desired, hardening can also be carried out or, if appropriate, completed at a higher temperature, for example up to about 200°, especially at about 40° to 100° C. One of the advantages of the present mixtures of materials is that, depending on the choice of the components (b) and (c) and, if desired, a hardening accelerator and depending on the relative quantity of the components (b) and (c), the pot life of the hardenable mixtures can be adjusted virtually as desired. The same applies also to the properties of the hardened products. Depending on the nature and the relative quantity of the dithiol (b) and the polyamine (c), epoxide resin systems having a very wide range of flexibility and toughness can be prepared. The total quantity of the hardener (b) plus (c) is preferably calculated such that it corresponds to the stoichiometrically required quantity.

Depending on the nature of the epoxide resin (a) used or its epoxide equivalent, and of the dithiol (b) and polyamine (c) used, the relative quantities of the components can vary very widely. The quantities of the components (b) and (c) employed will also depend on the intended application, i.e. on the desired flexibility of the hardened product and on the desired pot life of the mixture of materials. In general, both the flexibility and the pot life rise with an increase in the relative quantity of the dithiol in the dithiol/polyamine mixture.

5–30% by weight, preferably 10–25% by weight, of dithiol (b) and 3–35% by weight, preferably 5–20% by weight, of polyamine (c), relative to the total quantity of the components (a), (b) and (c), have proved to be particularly suitable.

Particularly good properties of the hardened products are also achieved if the proportion of the hydrogen atoms bound to the thiol groups of the dithiol (b) is 15–85%, preferably 20–80% and particularly preferably 25–75%, relative to the total number of the active hydrogen atoms bound to the thiol groups of the dithiol (b) and those bound to the amino groups of the polyamine (c).

If desired, plasticizers can also be added to the mixtures according to the invention for a further increase in flexibility. The invention therefore also relates to mixtures which additionally contain (d) a plasticizer in addition to the components (a), (b) and (c). All the compounds known as plasticizers in the art can here be used. Examples of suitable plasticizers are esters of phthalic acid such as dibutyl phthalate, esters of phosphoric acid, esters of adipic and sebacic acid, glycols, esters of glycolic acid or polyols.

Benzyl alcohol and especially 3-phenylpropanol have proved to be particularly suitable plasticizers.

The quantity of the plasticizer (d) is preferably 4–25 parts by weight, especially 6–20 parts by weight, relative to 100 parts by weight of epoxide resin (a).

If desired, reactive diluents, for example butanediol diglycidyl ether, monoglycidyl ethers of isomeric higher alcohols, for example Grilonit RV 1814 ® made by Ems-Chemie, or butyl glycidyl ether, 2,2,4-trimethylpentyl glycidyl ether, phenyl glycidyl ether, cresyl glycidyl ether or glycidyl esters can be added to the hardenable mixtures in order to reduce the viscosity.

The mixtures of materials according to the invention can also contain adhesion promoters. In principle, any known adhesion promoter can be used. Silanes, for example γ-glycidyloxypropyltrimethoxysilane (Silane A-187 made by Union Carbide) or γ-mercaptopropyltrimethoxysilane (Silane A-189 made by Union Carbide) or titanium compounds such as tetraisopropyl bis-(dioctylphosphonato)-titanate (KR 41B made by Kenrich Petrochemicals Inc., USA), have proved to be particularly suitable adhesion promoters.

As further conventional additives, the mixtures according to the invention can also contain extenders, fillers and reinforcing agents, for example bituminous coal tar, bitumen, textile fibres, glass fibres, asbestos fibres, boron fibres, carbon fibres, mineral silicates, mica, quartz powder, hydrated alumina, bentonites, wollastonite, kaolin, silica aerogel or metal powders, for example aluminum powder or iron powder and also pigments and dyes, such as carbon black, oxide pigments and titanium dioxide, flameproofing agents, thixotropic agents, flow control agents such as silicones, waxes and stearates, some of which are also used as mould-release agents, antioxidants and light stabilizers.

The mixtures of materials according to the invention can be prepared in the conventional manner by mixing components by means of known mixing apparatus (stirrers, rollers).

The hardened products are distinguished by the advantageous properties described at the outset. Fully hardened epoxide resins having the flexibility and tough-elastic properties of the products according to the invention have so far not been known. In addition, the crosslinked products according to the invention show, in spite of their high flexibility and tough elasticity, also outstanding mechanical and thermal properties which are retained also after prolonged storage, even at an elevated temperature. The crosslinked products are also distinguished by good resistance to chemicals.

The mixtures according to the invention can be used, for example, as adhesives, matrix resins, surface coatings, sealing compositions or injection compositions or quite generally for the manufacture of hardened products. They can be used in a formulation adapted to each specific field of application, in the unfilled or filled state, for example as sealing compositions, paints, coating compositions, surface coatings, dipping resins, casting resins, impregnating resins, laminating resins, matrix resins and adhesives.

The invention therefore also relates to the use of the mixtures according to the invention for the production of sealing compositions, injection compositions, adhesives, mould resins, matrix resins, casting resins or coating compositions.

The examples which follow explain the invention.

Examples

Preparation Example H1 a) Preparation of the polytetrahydrofurandithiols A–C

A: y=7–8; B: y=12–13; C: y=26–27

500 ml of thionyl chloride are added dropwise under $N_2$ to 1 mol of the appropriate poly-THF (commercial product from BASF AG) and 1 ml of pyridine at 40°–50° C. The clear, yellowish solution is boiled for 6 hours at 80° C. under reflux. Excess thionyl chloride is distilled off in vacuo and the yellow viscous poly-THF dichloride is dried at 80° C. in a high vacuum. The poly-THF dichloride obtained in this way is added dropwise to a boiling solution of 2.2 mol of thiourea in 650 ml of 95% ethyl alcohol and boiled overnight at 76° C. under reflux. The ethyl alcohol is then distilled off, and 0.5 g of benzyltrimethylammonium chloride in 600 ml of 6N NaOH solution are added to the viscous residue. The mixture is boiled for 2 hours at 95° C., then cooled to 60° and acidified to pH=2 with 32% HCl in portions. After cooling to room temperature, 750 ml of ethyl acetate are added, the phases are separated, and the organic phase is washed with $H_2O$, dried over $Na_2SO_4$ and concentrated in vacuo.

Physical data

| Dithiol | 1 | 2 | 3 |
|---|---|---|---|
| Yield | 91% | 90% | 90% |
| $\overline{M}_n$ (GPC in THF) | 1137 | 1719 | 3090 |
| $\overline{M}_w/\overline{M}_n$ | 1.68 | 1.87 | 2.78 |
| S content[1] (% by weight) | 7.7 | 5.7 | 2.68 |
| SH content[2] (meq./g) | 2.07 | 1.56 | 0.68 |
| Viscosity[3] at 40° C. (mPa · s) | 175 | 366 | 2420 |
| Melting range | liquid at room temperature | 23–27° C. | 30–35° C. |

[1]Elemental analysis
[2]Titration with 0.1N $AgNO_3$
[3]ICI cone and plate viscometer b) Preparation of the polyethylene glycol-dithiol D $HS{-}(CH_2CH_2O)_{7-8}{-}CH_2CH_2{-}SH$ This dithiol is prepared as described above under (a).

The composition of the mixtures of materials used in the examples and the properties of the hardened products can be seen from Tables 1 to 5.

Unless otherwise stated, hardening was always carried out for one week at room temperature.

The elongation at break, tear strength and tensile strength were all determined by DIN 53455.

The floating-roller peel strength was determined by means of ISO 4578-79.

The tensile shear strength was determined by means of DIN 53283.

The tear propagation resistance was determined by means of DIN 53356.

The determination of the glass transition temperature (Tg) was carried out by means of the Mettler thermoanalytic system TA 3000.

The determination of the Shore D hardness was carried out by means of the FRANK hardness tester 38024.

The gel time was determined by means of a Beck-Koller drying recorder from Hickle Laboratory Engineering Co, Gomshall, Surrey, UK. In this test, a freshly prepared resin/hardener mixture is applied to a glass plate (30×2.5 cm) in a layer thickness of about 200 μm. A 1 mm thick needle is moved, perpendicular to the glass plate, in the course of 24 hours from one end of the glass plate to the other (30 cm). As soon as the mixture starts to gel, the needle leaves distinct tracks on the glass plate. The time corresponding to the first visible tracks is called the gel time.

The following epoxide resins and dithiols were used:

Epoxide resin 1: Bisphenol A diglycidyl ether having an epoxide equivalent weight of 190.5 g/equivalent.

Epoxide resin 2: Bisphenol A diglycidyl ether having an epoxide equivalent weight of 191.5 g/equivalent.

Epoxide resin 3: A mixture of 73.6% by weight of bisphenol A diglycidyl ether and 26.4% by weight of cresyl glycidyl ether having an epoxide equivalent weight of 187 g/equivalent.

Epoxide resin 4: Monoglycidyl ether of a higher isomeric alcohol having an epoxide equivalent weight of 286–312 g/equivalent and a viscosity of 10 mPa·s at 25° C. (Grilonit RV 1814® from Ems-Chemie).

Dithiol 1: Triglycol dimercaptan of the formula $HS(CH_2CH_2O)_2CH_2CH_2SH.$

Dithiol 2: Polyethylene glycol dithiol D of the formula $HS(CH_2CH_2O)_{7-8}{-}CH_2CH_2SH$ (prepared according to Example H1).

Dithiol 3: Polytetrahydrofuran-dithiol A of the formula $HS(CH_2CH_2CH_2O)_{7-8}{-}CH_2CH_2CH_2CH_2SH$ (prepared according to Example H1).

Dithiol 4: Polytetrahydrofuran-dithiol B of the formula $HS(CH_2CH_2CH_2O)_{12-13}{-}CH_2CH_2CH_2CH_2SH$ (prepared according to Example H1).

The polyamines used in each of the mixtures, and the plasticizers and adhesion promoters if also used, can be seen from the tables which follow.

TABLE 1

| Example | | 1 | 2 | 3 |
|---|---|---|---|---|
| Epoxide resin | (g) | 100 | 100 | 100 |
| Dithiol 1 | (g) | 35 | 27.1 | 19.6 |
| Amine 1* | (g) | 5.1 | 8.2 | 11.1 |
| Elongation at break | (%) | 202 | 57.2 | 11.4 |
| Tear strength | (N/mm²) | 17.7 | 13.6 | 10.7 |
| Tensile strength | (N/mm²) | 17.8 | 42.4 | 59.4 |
| $T_G$ | (°C.) | 28 | 36 | 48 |
| Shore D Hardness | | 60 | 77 | 80 |
| Gel time at room temperature | (hours) | 6 | 3½ | 4 |

*$H_2N{-}{-}O{-}{-}O{-}{-}NH_2,$
Jeffamine ® EDR-148 from Texaco

The following tests are carried out with the mixture according to Example 1:

a) Floating-roller peel strength 6.9–7.9 N/mm (80% cohesive fracture)

b) Tensile shear strength (adhesive bonding to Al-Anticorodal 100 B)
after 20 hours at 50° C.: 20.9 N/mm²
after 8 weeks at 50° C.: 26.7 N/mm²
after 6 weeks at 80° C.: 23.8 N/mm²
after 30 minutes at 180° C., followed by 9 hours in water at 100° C. and 15 days at room temperature in air: 12.4 N/mm² c) Tensile shear strength (adhesive bonding to oily steel sheet)
after 30 minutes at 180° C. and 18 days at room temperature: 10.0 N/mm² d) Shear strength after 2 weeks at room temperature
Adhesive bonding to SMC[1]: 6.2 N/mm²
Adhesive bonding to ABS[2]: 6.9 N/mm²

[1]: Glass fibre laminate produced with a moulding compound of unsaturated polyester (sheet moulding compound).

[2]: Graft polymer of acrylonitrile and styrene on butadiene polymer.

| | (e) Heat resistance | |
|---|---|---|
| | After 1 month at room temperature | After 30 minutes at 180° C. and 9 days at room temperature |
| Elongation at break (%) | 193 | 194 |
| Tear strength (N/mm²) | 17.2 | 14.1 |
| Tensile strength (N/mm²) | 17.2 | 14.1 |
| Tear propagation resistance (N/mm) | 42.3 | — |

TABLE 2

| Example | | 4 | 5 | 6 |
|---|---|---|---|---|
| Epoxide resin | (g) | 100 | 100 | 100 |
| Dithiol 1 | (g) | 30.5 | 15.6 | 7.9 |
| Amine 2* | (g) | 21.9 | 40.6 | 50.4 |
| Elongation at break | (%) | 188.5 | 72.4 | 9.3 |
| Tear strength | (N/mm²) | 18.4 | 17.2 | 14.9 |
| Tensile strength | (N/mm²) | 15.5 | 31.7 | 48.9 |
| $T_G$ | (°C.) | 24 | 36 | 43 |
| Shore D Hardness | | 50 | 72 | 75 |
| Gel time at room temperature | (hours) | >24 | >24 | >24 |

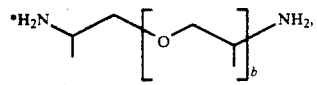

* $H_2N$ —[—]— $NH_2$,
b = 5-6
Jeffamine ® D 400 from Texaco

TABLE 3

| | Example | | | | | | | |
|---|---|---|---|---|---|---|---|---|
| | 7 | 8 | 9 | 10 | 11 | 12 | 13 | 14 |
| Epoxide resin 1 (g) | 100 | 100 | 100 | 100 | — | — | — | — |
| Epoxide resin 2 (g) | — | — | — | — | 100 | — | — | — |
| Epoxide resin 3 (g) | — | — | — | — | — | 50.8 | 52.4 | 55.6 |
| Dithiol 1 (g) | 35.2 | 27.2 | 19.8 | 12.8 | 14.2 | 7.5 | 2.5 | 1.25 |
| Amine 3* (g) | 5.5 | 8.9 | 12.1 | 15.2 | 14.5 | 7.5 | 10.0 | 11.25 |
| Benzyl alcohol (g) | — | — | — | — | — | 6.6 | 7.7 | 6.8 |
| 3-Phenylpropanol (g) | — | — | — | — | 13.1 | — | — | — |
| Elongation at break (%) | 188.5 | 20.5 | 9.6 | 9.7 | 53.5 | 160 | 124 | 33.8 |
| Tear strength (N/mm²) | 15.2 | 19.9 | 16.7 | 30.3 | 21.6 | 6.8 | 19.0 | 21.9 |
| Tensile strength (N/mm²) | 17.9 | 49.9 | 61.2 | 67.6 | 24.6 | 6.8 | 25.8 | 37.7 |
| Tg (°C.) | 28 | 39 | n.d. | n.d. | 36 | 15 | 35 | 34 |
| Shore D hardness | 60 | 78 | 81 | 81 | 75 | 27 | 75 | 80 |
| Gel time at room temperature (hours) | 5½ | 2¼ | 1¼ | 1¼ | n.d. | n.d. | n.d. | n.d. |

*2,2,4-Trimethylhexane-1,6-diamine
n.d.: not determined

The following tests were carried out on the mixture according to Example 7:

a) Floating-roller peel strength 7.7–8.3 N/mm (100% cohesion fracture)

b) Tensile shear strength (adhesive bonding to Al-Anticorodal 100 B)
   after 20 hours at 50° C.: 22.2 N/mm²
   after 8 weeks at 50° C.: 18.4 N/mm²
   after 30 minutes at 180° C.: 22.2 N/mm² c) Tensile shear strength (adhesive bonding to oily steel sheet)
   after 30 minutes at 180° C. and 18 days at room temperature: 7.1 N/mm² d) Tensile shear strength after 2 weeks at room temperature
   Adhesive bonding to SMC[1]: 8.6 N/mm²
   Adhesive bonding to ABS[2]: 7.4 N/mm²
   Adhesive bonding to glass: 7.4 N/mm²
   Adhesive bonding to polyamide: 3.4 N/mm²

[1]: Glass fibre laminate produced with the moulding compound of unsaturated polyester (sheet moulding compound)

[2]: Graft polymer of acrylonitrile and styrene on butadiene polymer

Below, the mixture according to Example 7 is tested after the hardener component consisting of the dithiol 1 and the amine 3 had been stored under the conditions indicated below. The values for comparison with freshly prepared hardener component can be seen from Table 3 above.

| Property of the crosslinked system | Storage of the hardener component in daylight for | | |
|---|---|---|---|
| | 3 months at room temperature | 6 months at room temperature | 1 week at 50° C. |
| Elongation at break (%) | 194 | 153 | 129 |
| Tear strength (N/mm²) | 18.3 | 21.5 | 20.9 |
| Tensile strength (N/mm²) | 18.3 | 22.8 | 20.9 |

The measured values show that the properties of the crosslinked system are not impaired even after prolonged storage of the hardener component.

TABLE 4

| | Example | | | |
|---|---|---|---|---|
| | 15 | 16 | 17 | 18 |
| Epoxide resin 1 (g) | 100 | 100 | 100 | 100 |
| Dithiol 1 (g) | 35.2 | 27.4 | 28.4 | 21.3 |
| Amine 4* (g) | 5.8 | 9.5 | 9.1 | 12.4 |
| 3-Phenylpropanol (g) | — | — | 4.5 | 8.3 |
| Elongation at break (%) | 200.2 | 13.3 | 106 | 56.4 |
| Tear strength (N/mm²) | 19.0 | 18.1 | 20.1 | 18.7 |
| Tensile strength (N/mm²) | 19.0 | 50.8 | 22.0 | 34.6 |
| $T_G$ (°C.) | 31 | 40 | 37 | 40 |
| Shore D Hardness | 70 | 80 | 77 | 83 |
| Gel time at room temperature (hours) | 5 | 3½ | 3 | 3 |

*Isophoronediamine

The following tests are carried out with the mixture according to Example 15:

a) Floating-roller peel strength 4.4–6 N/mm (70% cohesion fracture)

b) Tensile shear strength (adhesive bonding to Al-Anticorodal 100b)
   after 20 hours at 50° C.: 20.7 N/mm²
   after 30 minutes at 180° C. and 18 days at room temperature: 14.4 N/mm² c) Tensile shear strength (adhesive bonding to oily steel)
after 30 minutes at 180° C. and 18 days at room temperature: 9.7 N/mm²

TABLE 5

| Example | 19 | 20 | 21 | 22 | 23 | 24 | 25 | 26 |
|---|---|---|---|---|---|---|---|---|
| Epoxide resin 2 (g) | 100 | 100 | 100 | 100 | 100 | 100 | 100 | 100 |
| Dithiol 1 (g) | 14.6 | 25.5 | 13.7 | 18.3 | 16.8 | 14.5 | 15 | 15.8 |
| Amine type* (g) | No. 5 | No. 6 | No. 7 | No. 8 | No. 9 | No. 10 | No. 11 | No. 12 |
| Amine quantity (g) | 17.2 | 23.2 | 7.7 | 8.7 | 7.5 | 14.0 | 21.5 | 28/3 |
| Benzyl alcohol (g) | 6.6 | — | — | — | — | — | — | — |
| 3-Phenylpropanol (g) | — | — | 15.2 | — | — | 15.9 | 13.2 | 13.4 |
| Silane A 189 (g) | 6.7 | 6.9 | — | 5.9 | 6.2 | — | — | — |
| KR 41B (g) | 3.3 | 3.5 | — | 3.0 | 3.1 | — | — | — |
| Elongation at break (%) | 26.4 | 68.5 | 37.8 | 9.8 | 12.7 | 22.4 | 96.4 | 77.3 |
| Tear Strength (N/mm²) | 24.2 | 21.1 | 24.9 | 33.3 | 27.2 | 21.3 | 16.1 | 18.9 |
| Tensile strength (N/mm²) | 32.4 | 21.1 | 32.7 | 47.9 | 48.9 | 41.6 | 16.2 | 19.0 |
| Tg(°) | 46 | 24 | 40 | 47 | 50 | 47 | 28 | 27 |
| Shore D hardness (g) | 79 | 62 | 77 | 82 | 82 | 80 | 48 | 64 |

*Amine No. 5: Bis-(4-aminocyclohexyl)-methane
*Amine No. 6: Polyaminoimidazoline (57.3 g/NH; Eurodur ® from Schering AG)
*Amine No. 7: Diethylenetriamine
*Amine No. 8: Bis-(3-aminopropyl)-amine
*Amine No. 9: Triethylenetetramine
*Amine No. 10: Pentaethylenehexamine

*Amine No. 11:
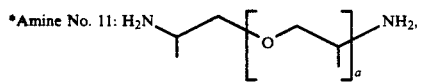
a = 2-3
Jeffamine ® D 230 from Texaco

12:
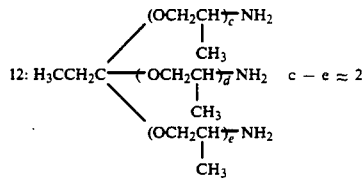
c − e ≈ 2
Jeffamine ® T 403 from Texaco

EXAMPLE 27

Use of the hardenable mixtures as a flexible injection system and as a sealing composition

| Composition | |
|---|---|
| Epoxide resin 1 | 100 g |
| Epoxide resin 4 | 10.3 g |
| Dithiol 1 | 29.6 g |
| Amine 3 | 7.9 g |

Concrete prisms of 4×4×16 cm are cut across the middle by a 2 mm wide diamond saw. The two parts of the concrete prisms are wrapped in a thin latex envelope or plastic film and fixed in a PVC mould in such a way that a 1.5 mm or 15 mm wide gap is formed. When this is used as an injection system, the epoxide resin mixture having a viscosity of 300 to 2000 mPa·s is injected by means of a cannula into the 1.5 mm wide gap. For use as a sealing composition, the fresh epoxide resin mixture is rendered thixotropic by means of 3% by weight of Aerosil, relative to the total weight, and then applied into the 15 mm wide gap.

Tensile tests using the type 1484 machine made by Zwick; initial force 0.1 N/mm²; testing speed 10 mm/minute.

1 mm thick hard rubber pieces are placed between the clamping jaws and the concrete prisms, in order to prevent destruction of the concrete prisms by the compressive force of the clamping jaws.

a) After 3 weeks' storage at room temperature: (Tg of the mass = 21° C.)
Tensile strength
at 1.5 mm gap width: 4.8 N/mm² (fracture of the concrete)
at 15 mm gap width: 4.2 N/mm² (fracture of the concrete in some cases)

b) After 4 weeks' storage at 5° C. (the composition also contains additionally 1% by weight, relative to the total weight, of γ-glycidyloxypropyltrimethoxysilane as an adhesion promoter): (Tg of the mass = 15° C.)
Tensile strength
at 1.5 mm gap width: 5.4 N/mm² (fracture of the concrete)
at 15 mm gap width: 4.8 N/mm² (fracture of the concrete)

EXAMPLE 28

Testing of the resistance to chemicals

| Composition I | | Properties after 10 days at room temperature | |
|---|---|---|---|
| Epoxide resin 1 | 100 g | Elongation at break (%) | 183 |
| Dithiol 1 | 37.2 g | Tear strength (N/mm²) | 3.3 |
| Amine 13* | 4 g | Tensile strength (N/mm²) | 3.3 |
| Benzyl alcohol | 7.5 g | Shore D hardness | 14 |
| | | Tg (°) | 14 |

*α,α'-Diamino-m-xylene

Composition II

Corresponds to the composition according to Example 7.

Sandblasted steel sheets are coated with the compositions I and II (layer thickness about 200 μm) and stored for the time indicated in the table in the particular medium. The assessment of the coating is as follows:
+ = resistant (no change detectable)
A = attacked (bubble formation detectable)
Z = destroyed (coating attacked to such an extent that it no longer adheres).

|  | Composition | | | | | | | | | |
|---|---|---|---|---|---|---|---|---|---|---|
|  | I | | | | | II | | | | |
| Test duration in weeks at room temperature | ½ | 1 | 2 | 4 | 8 | 12 | ½ | 1 | 2 | 4 | 8 |
| Deionized water | + | + | + | + | + | + | + | + | + | + | + |
| Hydrochloric acid |  |  |  |  |  |  |  |  |  |  |  |
| 20% | + | + | + | + | + | + | + | + | + | + | + |
| 36% | Z |  |  |  |  |  | Z |  |  |  |  |
| Sulfuric acid 50% | + | + | + | + | + | A | + | + | + | A | Z |
| Ammonia | + | A | + | A | A | A | + | + | + | + | A |
| Xylene | + | + | + | A | Z | Z | + | + | + | + |  |
| Ethanol |  |  |  |  |  |  |  |  |  |  |  |
| 95% | + | A | + | A | Z | Z | + | + | + | + | A |
| 50% | + | + | A | A | A | A | + | + | + | + | A |
| Acetic acid |  |  |  |  |  |  |  |  |  |  |  |
| 10% | + | + | + | + | + | + | A | A | A | A |  |
| 5% | + | + | + | + | + | + | A | A | A | A |  |

EXAMPLES 29-31

Mixtures of epoxide resin materials, containing polytetrahydrofuran-dithiols A or B, or polyethylene glycol-dithiol D The composition of the mixtures of materials used in the examples and the properties of the hardened products can be seen from the table. Hardening is carried out in each case for one week at 80° C.

|  | Example | | |
|---|---|---|---|
|  | 29 | 30 | 31 |
| Epoxide resin 1 (g) | 100 | 100 | 100 |
| Dithiol 3 (g) | 25.1 | — | — |
| Dithiol 4 (g) | — | 13.7 | — |
| Dithiol 2 (g) | — | — | 38.3 |
| Amine 3 (cf. Table 3) (g) | — | — | 14.8 |
| Amine 2 (cf. Table 2) (g) | 54.4 | 57.9 | — |
| Elongation at break % | 74 | 65 | 57 |
| Tear strength (N/mm²) | 11.8 | 23.5 | 20.7 |
| Tensile strength (N/mm²) | 11.8 | 33.4 | 21.3 |
| Shore D hardness | 35 | 68 | 70 |
| Tg (°C.) | 18 | 38 | 33 |

What is claimed is:

1. A hardenable mixture of materials, comprising
(a) an epoxide resin
(b) a dithiol of the formula I or II

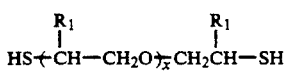

in which the $R_1$s independently of one another are hydrogen or methyl, x is an integer from 2 to 50 and y is an integer from 1 to 30, and
(c) an aliphatic, cycloaliphatic or heterocyclicpolyamine having at least two primary amino groups.

2. A mixture of materials according to claim 1, wherein the epoxide resin is a polyglycidyl ether of a polyhydric phenol.

3. A mixture of materials according to claim 1, wherein the mean molecular weight $\overline{M}_n$ of the dithiols of the formula I or II is less than 2000.

4. A mixture of materials according to claim 1, wherein x in the formula I is an integer from 2 to 20 and y in the formula II is an integer from 1 to 12.

5. A mixture of materials according to claim 1, wherein the dithiol is a compound of the formula I, in which $R^1$ is hydrogen and x is 2.

6. A mixture of materials according to claim 1, wherein the polyamine (c) is an aliphatic or cycloaliphatic polyamine.

7. A mixture of materials according to claim 6, wherein the cycloaliphatic polyamine is 3-aminomethyl-3,5,5-trimethylcyclohexylamine (isophoronediamine) or 4,4'-diaminedicyclohexylmethane.

8. A mixture of materials according to claim 6, wherein the aliphatic polyamine is a compound of the formulae IV to IX

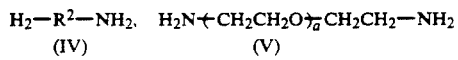

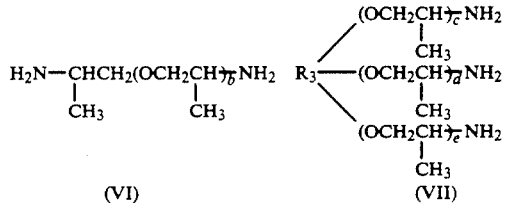

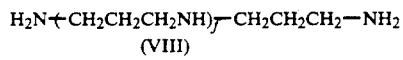

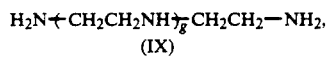

in which $R^2$ is a straight-chain or branched $C_2$-$C_{10}$alkylene radical, a is an integer from 1 to 10, b is an integer from 1 to 10, c, d and e independently of one another are an integer from 1 to 20, f is an integer from 1 to 5 and g is an integer from 1 to 10, and $R^3$ is a trivalent radical of the formula

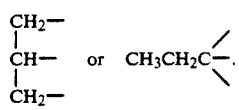

9. A mixture of materials according to claim 1, wherein the quantity of the dithiol (b) is 5-30% by weight, relative to the total quantity of components (a), (b) and (c).

10. A mixture of materials according to claim 1, wherein the quantity of polyamine (c) is 3-35% by weight, relative to the total quantity of components (a), (b) and (c).

11. A mixture of materials according to claim 1, wherein the proportion of the hydrogen atoms bound to the thiol groups of dithiol (b) is 15-85%, relative to the total number of the active hydrogen atoms bound to the thiol groups of the dithiol (b) and those bound to the amino groups of the polyamine (c).

12. A mixture of materials according to claim 1, which also contains (d) a plasticizer in addition to the components (a), (b) and (c).

13. A mixture of materials according to claim 12, wherein the plasticizer is benzyl alcohol or 3-phenylpropanol.

14. A mixture of materials according to claim 12, wherein the quantity of the plasticizer (d) is 4-25 parts by weight, relative to 100 parts by weight of the epoxide resin (a).

15. The crosslinked products obtained by hardening the mixture of materials according to claim 1.

16. A mixture of materials according to claim 1, wherein the polyamine (c) is a heterocyclic polyamine.

17. A mixture of materials according to claim 16, wherein the heterocyclic polyamine is a polyaminoimidazoline.

* * * * *